United States Patent
Rome et al.

(10) Patent No.: US 12,439,981 B2
(45) Date of Patent: Oct. 14, 2025

(54) ZIP STRAP TETHER

(71) Applicant: API FABCUTS, LLC, El Paso, TX (US)

(72) Inventors: Patrick Rome, El Paso, TX (US); Elizabeth S. Rome, El Paso, TX (US)

(73) Assignee: API FABCUTS, LLC, El Paso, TX (US)

( * ) Notice: Subject to any disclaimer, the term of this patent is extended or adjusted under 35 U.S.C. 154(b) by 0 days.

(21) Appl. No.: 18/007,630

(22) PCT Filed: Jun. 1, 2021

(86) PCT No.: PCT/US2021/035309
§ 371 (c)(1),
(2) Date: Dec. 1, 2022

(87) PCT Pub. No.: WO2021/247617
PCT Pub. Date: Dec. 9, 2021

(65) Prior Publication Data
US 2023/0227226 A1    Jul. 20, 2023

Related U.S. Application Data

(60) Provisional application No. 63/166,921, filed on Mar. 26, 2021, provisional application No. 63/110,278, (Continued)

(51) Int. Cl.
*B65D 63/10* (2006.01)
*A41D 13/11* (2006.01)

(52) U.S. Cl.
CPC ...... *A41D 13/1184* (2013.01); *A41D 13/1107* (2013.01); *A41D 13/1161* (2013.01);
(Continued)

(58) Field of Classification Search
CPC ............ B65D 63/1018; B65D 63/1027; Y10T 24/1498; Y10T 24/141; F16L 3/233
See application file for complete search history.

(56) References Cited

U.S. PATENT DOCUMENTS 3,224,054 A * 12/1965 Lige .................. F16L 3/233
                                               248/74.3
3,438,095 A    4/1969 Evans
(Continued)

FOREIGN PATENT DOCUMENTS

| CN | 2787037 Y | 6/2006 |
| CN | 101512165 A | 8/2009 |

(Continued)

OTHER PUBLICATIONS

PCT/US2021/035309. International Search Report & Written Opinion (Sep. 1, 2021).
(Continued)

*Primary Examiner* — Jason W San
*Assistant Examiner* — Michael S Lee
(74) *Attorney, Agent, or Firm* — LOZA & LOZA, LLP; Kevin L. Soules

(57) ABSTRACT

A system and method for re-useable, self-locking, cinching, and bundling straps comprises wrapping a strap comprising: a plurality of teeth formed on a first edge of the strap, a plurality of teeth formed on a second edge of the strap, and at least one slit in the strap around an object; forming a loop around the object; inserting an end of the strap through the slit in the strap; and pulling the slack out of the loop.

9 Claims, 12 Drawing Sheets

Related U.S. Application Data filed on Nov. 5, 2020, provisional application No. 63/032,898, filed on Jun. 1, 2020.

(52) U.S. Cl.
CPC ......... B65D 63/1018 (2013.01); *Y10T 24/141* (2015.01); *Y10T 24/1498* (2015.01)

(56) References Cited

U.S. PATENT DOCUMENTS

| | | |
|---|---|---|
| 3,486,200 A | 12/1969 | Orenick |
| 3,780,401 A | 12/1973 | Reimer |
| 3,833,972 A | 9/1974 | Brumlik |
| 3,914,823 A | 10/1975 | Hara |
| 3,918,129 A | 11/1975 | Hara |
| 3,943,607 A | 3/1976 | Hara |
| 3,954,295 A * | 5/1976 | Harley ............... G09F 3/037 292/319 |
| 4,466,159 A | 8/1984 | Burrage |
| 5,079,803 A | 1/1992 | Moore |
| 5,294,068 A * | 3/1994 | Baro ............... B26F 3/02 225/45 |
| 5,531,166 A * | 7/1996 | Woods ............... B65D 71/0092 108/51.3 |
| 5,799,376 A | 9/1998 | Harsley |
| 6,490,821 B1 | 12/2002 | Lacek |
| D631,328 S | 1/2011 | Chen |
| 9,198,483 B2 | 12/2015 | Adams et al. |
| 9,655,413 B2 | 5/2017 | Adams et al. |
| 2005/0115028 A1 | 6/2005 | Cheung |
| 2007/0186388 A1 | 8/2007 | Rome |
| 2010/0146743 A1 | 6/2010 | Rome |
| 2014/0020229 A1 * | 1/2014 | Moore ............... F16L 3/233 24/270 |
| 2014/0283340 A1 * | 9/2014 | Beckman ............ B65D 63/1018 24/16 PB |
| 2016/0001943 A1 * | 1/2016 | Harsley ............... B65D 63/1027 24/16 PB |
| 2017/0267427 A1 * | 9/2017 | Martin ............... B65D 63/02 |

FOREIGN PATENT DOCUMENTS

| | | |
|---|---|---|
| DE | 202006006324 U1 | 8/2007 |
| GB | 2533980 A | 7/2016 |
| WO | 2006097739 A1 | 9/2006 |
| WO | 2019091742 A1 | 5/2019 |

OTHER PUBLICATIONS

EP 21817221.1 European Extended Search Report (Jul. 1, 2024).
CN 202180061159.2 Chinese Patent Application Office Action (Jun. 18, 2025).

* cited by examiner

ZIP STRAP TETHER

CROSS REFERENCE TO RELATED PATENT APPLICATIONS

This patent application claims the priority and benefit under 35 U.S.C. § 119(e) of U.S. Provisional Patent Application Ser. No. 63/032,898 filed Jun. 1, 2020, entitled "FACE SHIELD WITH ADJUSTABLE TENSIONING." U.S. Provisional Patent Application Ser. No. 63/032,898 is herein incorporated by reference in its entirety.

This patent application claims the priority and benefit under 35 U.S.C. § 119(e) of U.S. Provisional Patent Application Ser. No. 63/110,278 filed Nov. 5, 2020, entitled "ZIP STRAP TETHER." U.S. Provisional Patent Application Ser. No. 63/110,278 is herein incorporated by reference in its entirety.

This patent application claims the priority and benefit under 35 U.S.C. § 119(e) of U.S. Provisional Patent Application Ser. No. 63/166,921 filed Mar. 26, 2021, entitled "ZIP STRAP TETHER." U.S. Provisional Patent Application Ser. No. 63/166,921 is herein incorporated by reference in its entirety.

TECHNICAL FIELD

Embodiments disclosed herein are related to straps. Embodiments are further related to reusable straps and tethers. Embodiments are further related to straps having multiple teeth along both edges and staggered slits along the strap. Embodiments are further related to a unique re-useable, self-locking, cinching, and bundling tie. It is one aspect of the present embodiments to provide a zip strap tether. Embodiments are further related to self-engaging zip straps that are re-usable, simple, easy to use, quick to apply, and adjustable.

BACKGROUND

There are numerous examples of self-locking straps and ties used for a multitude of purposes such as bundling of wire, cord, and tubing, as well as bag closure and even the hanging of Christmas lights, or securing nets to fences.

Traditional zip ties are very useful but also have several major disadvantages. First, they are single use solutions. Once a zip tie is engaged, it cannot be disengaged. The only way to remove the zip tie is to cut it off and discard it. Likewise, most zip ties are of a fixed length. If a larger diameter is required a larger zip tie is required. This can be inconvenient particularly for applications which may include items of various sizes.

Therefore, a need exists for a zip strap tether that is strong, reusable, and adjustable, as described by the embodiments disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is one aspect of the present embodiments to provide a zip strap tether.

It is another aspect of the embodiments to provide a strap having multiple teeth along both edges and staggered slits along the strap.

It is another aspect of the embodiments to provide a zip strap that is self-engaging, re-usable, simple in design, effective in its performance, easy to use, quick to apply, and adjustable.

For example, in certain embodiments, a zip strap tether system comprises a strap, a plurality of teeth formed on a first edge of the strap, a plurality of teeth formed on a second edge of the strap, and at least one slit in the strap.

In another embodiment, a binding method comprises wrapping a strap comprising a plurality of teeth formed on a first edge of the strap, a plurality of teeth formed on a second edge of the strap, and at least one slit in the strap around an object, forming a loop around the object, inserting an end of the strap through the slit in the strap and pulling the slack out of the loop. The method can include wrapping the strap around the object at least twice.

In an embodiment, a zip strap tether system comprises a strap, a plurality of teeth formed on at least one edge of the strap, and at least one slit in the strap.

In an embodiment, the plurality of teeth formed on at least one edge of the strap further comprise a plurality of teeth from on a first edge of the strap, and a plurality of teeth formed on a second edge of the strap. In an embodiment, the plurality of teeth formed on at least one edge of the strap further comprise a plurality of teeth from on a first edge of the strap and a smooth edge formed on a second edge of the strap. In an embodiment, the plurality of teeth formed on at least one edge of the strap further comprise a plurality of slits from on a first edge of the strap and a plurality of slits formed on a second edge of the strap. In an embodiment, the plurality of teeth formed on at least one edge of the strap further comprise a plurality of slits from on a first edge of the strap and a smooth edge formed on a second edge of the strap.

In an embodiment, the zip strap tether system further comprises at least one perforation across the strap. In an embodiment, the at least one slit in the strap comprises a plurality of slits in the strap configured along the longitudinal axis of the strap. In an embodiment, the system further comprises at least one chad formed in the at least one slit. In an embodiment, the zip strap tether system further comprises a grip tip formed on at least one end of the strap.

In an embodiment, the strap comprises at least one of: renewable unbleached clay coated virgin kraft paper, treated carrierboard laminate coated water base compostable plastic film, paper clay coat coated kraft fiber wet strength carrierboard, reinforced polypropylene, laminate wet strength carrierboard with corn based compostable film, and wet strength clay coated recycled fiber carrierboard.

In an embodiment, the zip strap tether system further comprises a tag comprising a tag slit, wherein the strap is configured to fit through the tag slit.

In an embodiment, the zip strap tether system further comprises a cylindrical base structure wherein the strap is wound on the cylindrical base structure. In an embodiment, the zip strap tether system further comprises a box, the box configured to house the strap wound on the cylindrical base structure and an opening slot configured in the box. In an embodiment, the zip strap tether system further comprises an arm strap configured on the box.

In an embodiment, a binding method comprises wrapping a strap comprising a plurality of teeth formed on a first edge of the strap, a plurality of teeth formed on a second edge of the strap, and at least one slit in the strap around an object, forming a loop around the object, inserting an end of the strap through the slit in the strap, and pulling out slack in the loop. In an embodiment, the binding method further comprises wrapping the strap around the object at least twice. In an embodiment, the binding method further comprises tying a knot in the strap after the slack in the loop has been pulled.

In another embodiment, a zip strap tether system comprises a sheet of at least two straps, a plurality of teeth formed on at least one edge of each of the at least two straps, and at least one slit in the strap. In an embodiment, the zip strap tether system further comprises a cylindrical base structure wherein the sheet of at least two straps is wound on the cylindrical base structure. In an embodiment, the plurality of teeth formed on one of the at least two straps is interleaving with the plurality of teeth formed on another of the at least two straps.

Other objects and advantages of the present invention will become apparent from the following detailed description when viewed in conjunction with the accompanying drawings, which set forth certain embodiments of the invention.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
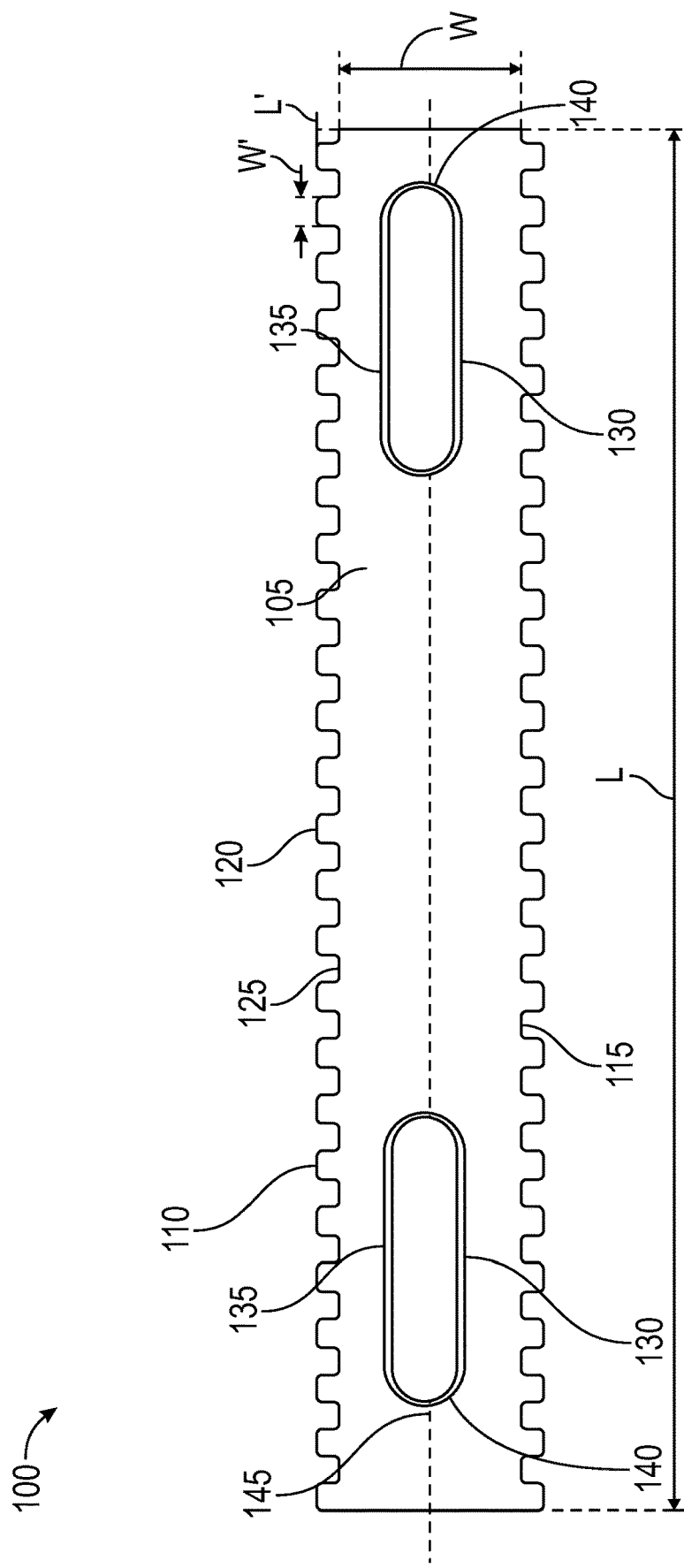
FIG. 1 depicts a zip strap tether system, in accordance with the disclosed embodiments.

The particular values and configurations discussed in the following non-limiting examples can be varied, and are cited merely to illustrate one or more embodiments, and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

U.S. Pat. No. 8,176,599, titled "CINCHING AND BUNDLING TIE" filed Mar. 1, 2010, describes a cinching and bundling tie. U.S. Pat. No. 8,176,599 is herein incorporated by reference in its entirety.

FIG. 1, illustrates an embodiment of a zip strap tether system 100. The zip strap tether system 100 comprises a generally planar, flat strap 105 having a length (L) and generally uniform width (W) made from a pliable semi-rigid material. In certain embodiments, the strap 105 can take other shapes. For example, the strap 105 can be configured to be flat, domed, tubular, cubed, etc. The flat strap 105 further includes a first edge 110 and a second edge 115. The thickness of the strap 105 will vary depending on the material used for manufacture and associated applications for the zip strap tether system 100. Materials can include, plastic, polymer, polypropylene, paper, cardboard, and the like, as well as laminated layers of one or more of any such material.

Along some or all of the length L of the two opposing edges of the strap 105 are teeth 120 in a repeating and uniform or non-uniform pattern having a width (w') and a length (L'). The teeth 120 are generally along first edge 110 and second edge 115. In an embodiment, the teeth 120 are separated by troughs 125 being inverse in shape to the teeth 120.

The zip strap tether system 100 further includes a series of slits 130 configured at intervals along the length of the flat strap 105. The intervals between the slits 130 can be selected to be equidistant and along the longitudinal axis 145 of the flat strap 105. In other embodiments, the slits 130 can be biased to one side or the other of the longitudinal axis 145 of the flat strap 105.

The slits 130 can be manufactured via stamping, with chads 135 connected in the slits 130 with perforations 140 so that the chads 135 can be removed. The slits 130 can be advantageously configured along a flat strap 105 so that an end of the flat strap can be inserted through the slit 130.

Figure 2:
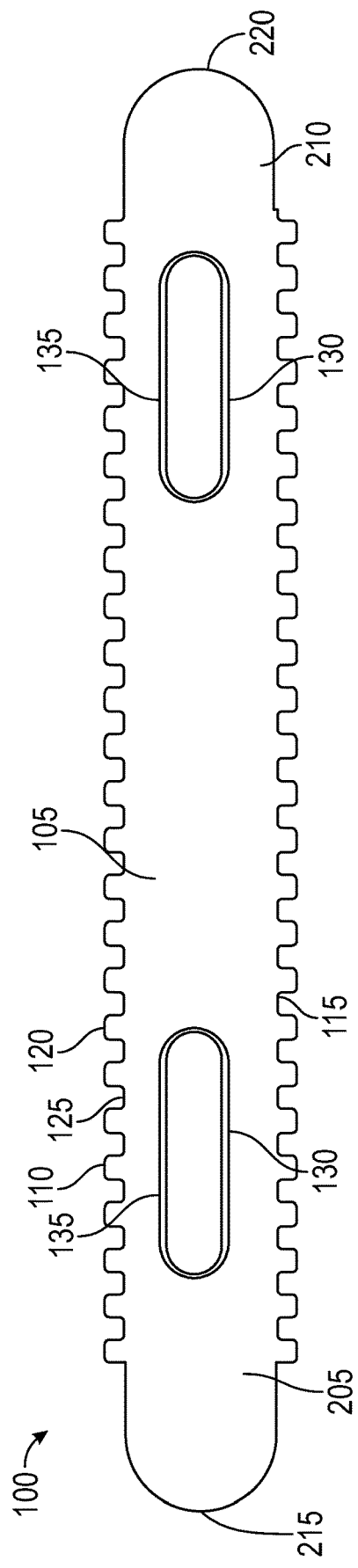
FIG. 2 depicts another embodiment of a zip strap tether system, in accordance with the disclosed embodiments.

FIG. 2 illustrates another embodiment of a zip strap tether system 100. In the embodiment illustrated in FIG. 2, the flat strap 105 includes a first grip tip 205 on one end and a second grip tip 210 on the other end. Each of the grip tips 205 and 210 can be textured to ease manipulation and are configured to fit through the slits 130. In certain embodiments, the outer edge 215 of grip tip 205 can be smooth. and the outer edge 220 of grip tip 210 can be smooth. In other embodiments, the edges of the grip tips 205 and 210 can be textured, ribbed, or otherwise configured to ease grip of the grip tip.

Figure 3A:
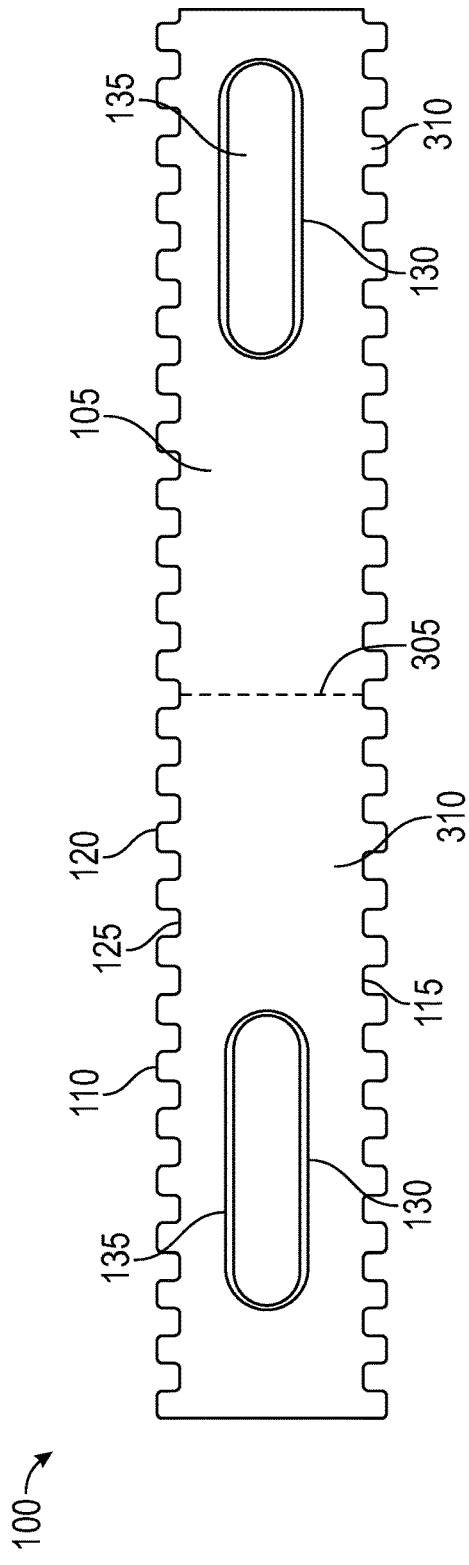
FIG. 3A depicts a zip strap tether system with a perforation, in accordance with the disclosed embodiments.
Figure 3B:
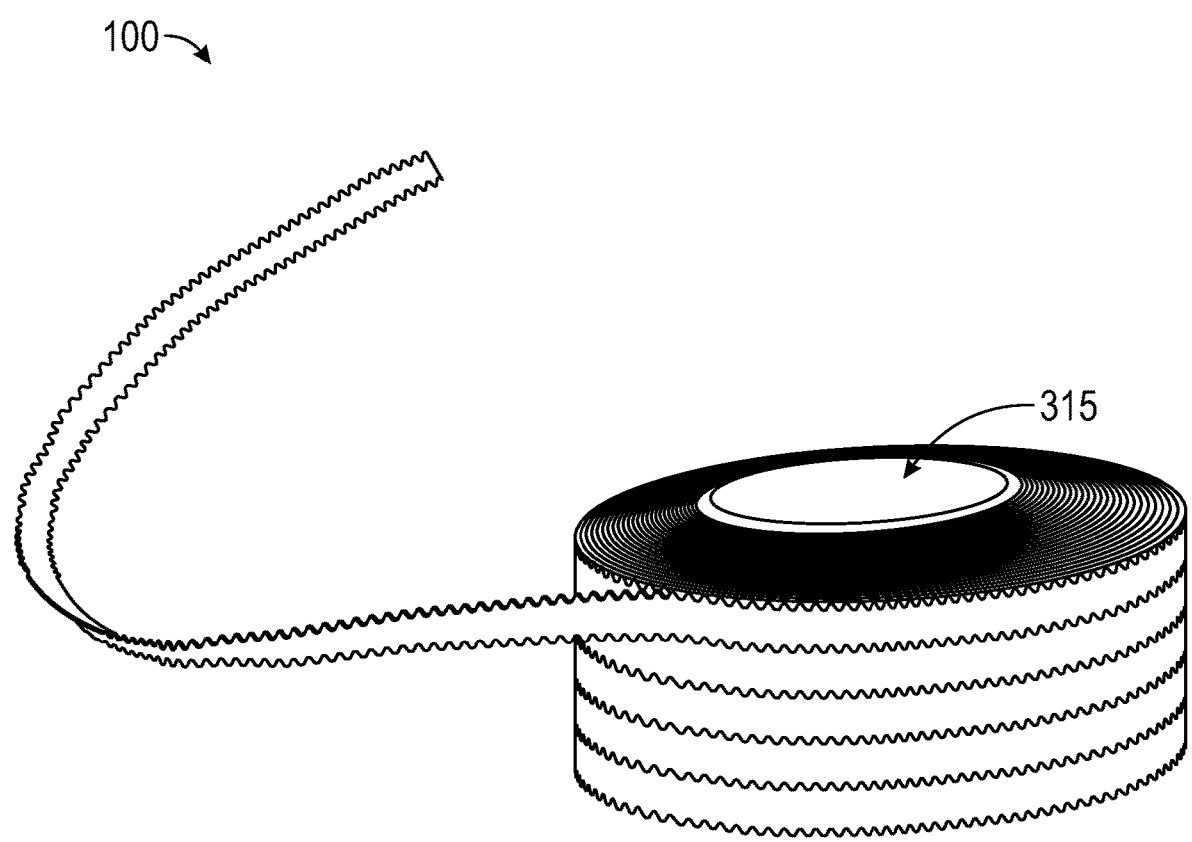
FIG. 3B depicts a sheet of straps in a roll, in accordance with the disclosed embodiments.

FIG. 3A illustrates another embodiment of a zip strap tether system 300. In this embodiment, the flat strap 105 is configured as a continuous flat strap 105 that can be stored as a roll 320 wound around a cylindrical base structure 315 as shown in FIG. 3B. The flat strap 105 can include perforations 305 configured intermittently along the flat strap 105. The perforations 305 ease the task of separating a section 310 of the flat strap 105 from the roll of strap material. In other embodiments, no such perforations are provided, and the strap can be cut to the desired length. These embodiments have the advantage of being continuous, allowing the necessary length to be selected for the desired application. FIG. 3B illustrates a zip strap tether system in accordance with the disclosed embodiments.

Figure 4A:
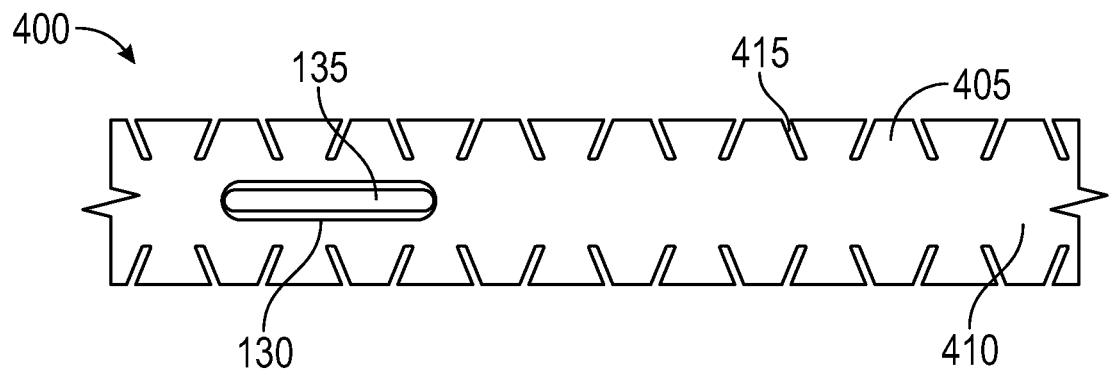
FIG. 4A depicts a zip strap tether system with slits, in accordance with the disclosed embodiments.

FIG. 4A shows an alternate embodiment of a strap system 400 wherein teeth 405 are formed by angled slits 415 in the planar strap 410. FIG. 4A illustrates one such embodiment of the system 400 wherein a laser cutting technique can be used to cut slits 415. This cutting technique creates slits 415 which can include a small space between the edges of adjacent teeth 405. Strap system 400 can further include one or more slits 130 and chads 135.

Figure 4B:
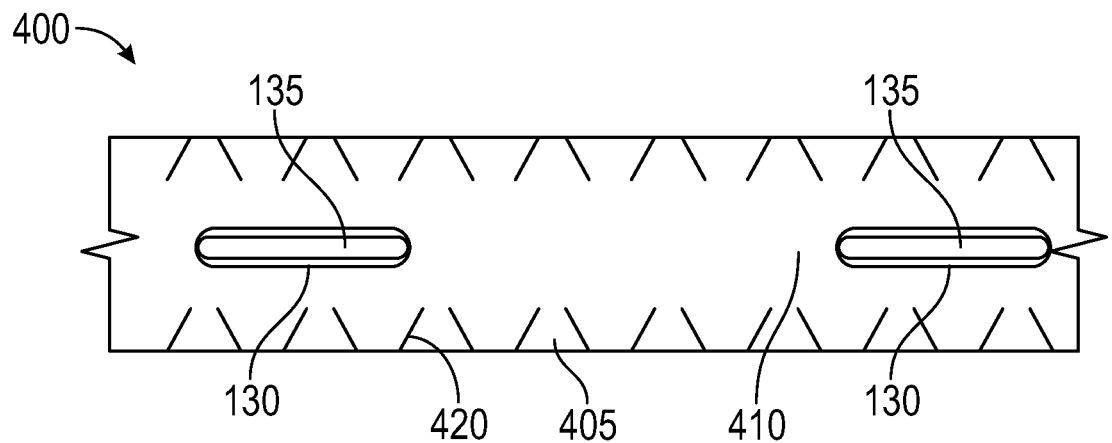
FIG. 4B depicts a zip strap tether system with slits, in accordance with the disclosed embodiments.

FIG. 4B illustrates another embodiment of a system 405 created using physical cutting tools to create slits 420. Slits 420 can be created with a knife type cutting tool or punch. Slits 420, formed in this way, do not leave a space between adjacent teeth 405. Both techniques and embodiments may be advantageous for various applications.

Figure 4C:
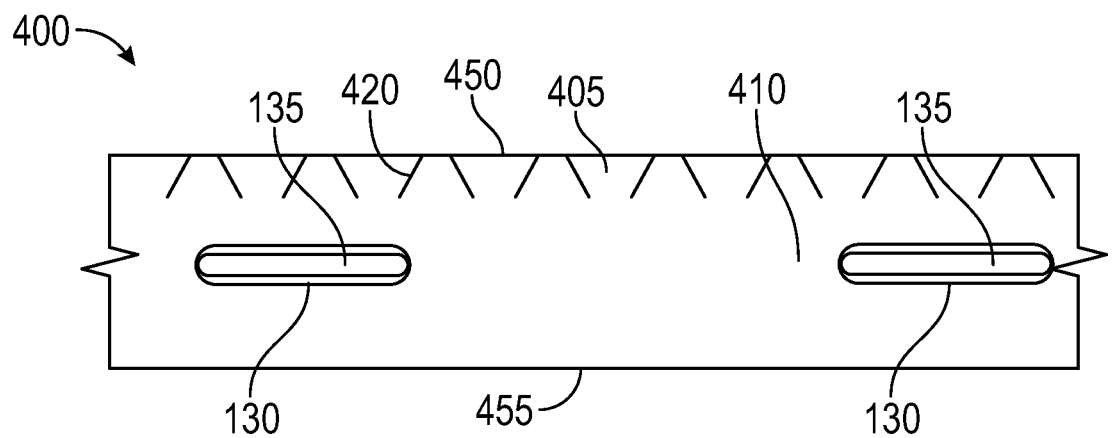
FIG. 4C depicts a zip strap tether system with one smooth edge, in accordance with the disclosed embodiments.

It should further be appreciated that, in any of the embodiments disclosed herein, the teeth and/or slits can be formed on only one side of the zip strap tether system. For example, FIG. 4C illustrates the formation of teeth 405 on only one side 450 of the zip strap tether system 400, while the opposing side 455 is smooth.

It should be appreciated that in the embodiments disclosed herein the teeth and/or slits forming the teeth need not be identical in length, depth, and/or shape. In certain embodiments, teeth and or slits of other shapes can also be used. For example, incongruous teeth and/or slits can be used in certain embodiments, along some or all of one or both edges of the system 100 or system 400 to improve or modify the functionality of the system 100 or system 400.

The tightest and most secure lock can be achieved if the width (w') of a tooth, at its widest point, is one fourth the width (w) of the strap, It has further been found that a tooth length (l') of one half the width (w) of the strap body achieves the most secure cinch. These attributes create a zip strap tether that is easily scalable and therefore can be utilized in a wide variety of applications. A variety of manufacturing processes can be employed to produce the zip strap tether. One such process utilizes die cutting techniques to cut sheets of material into the zip strap tethers (or ties). The ties can also be formed using molding or similar processes to form the strap with teeth as described above. Twisting the strap when cinching deflects the tabs/teeth so that the angle cuts engage and hold the strap in place.

Figure 5:
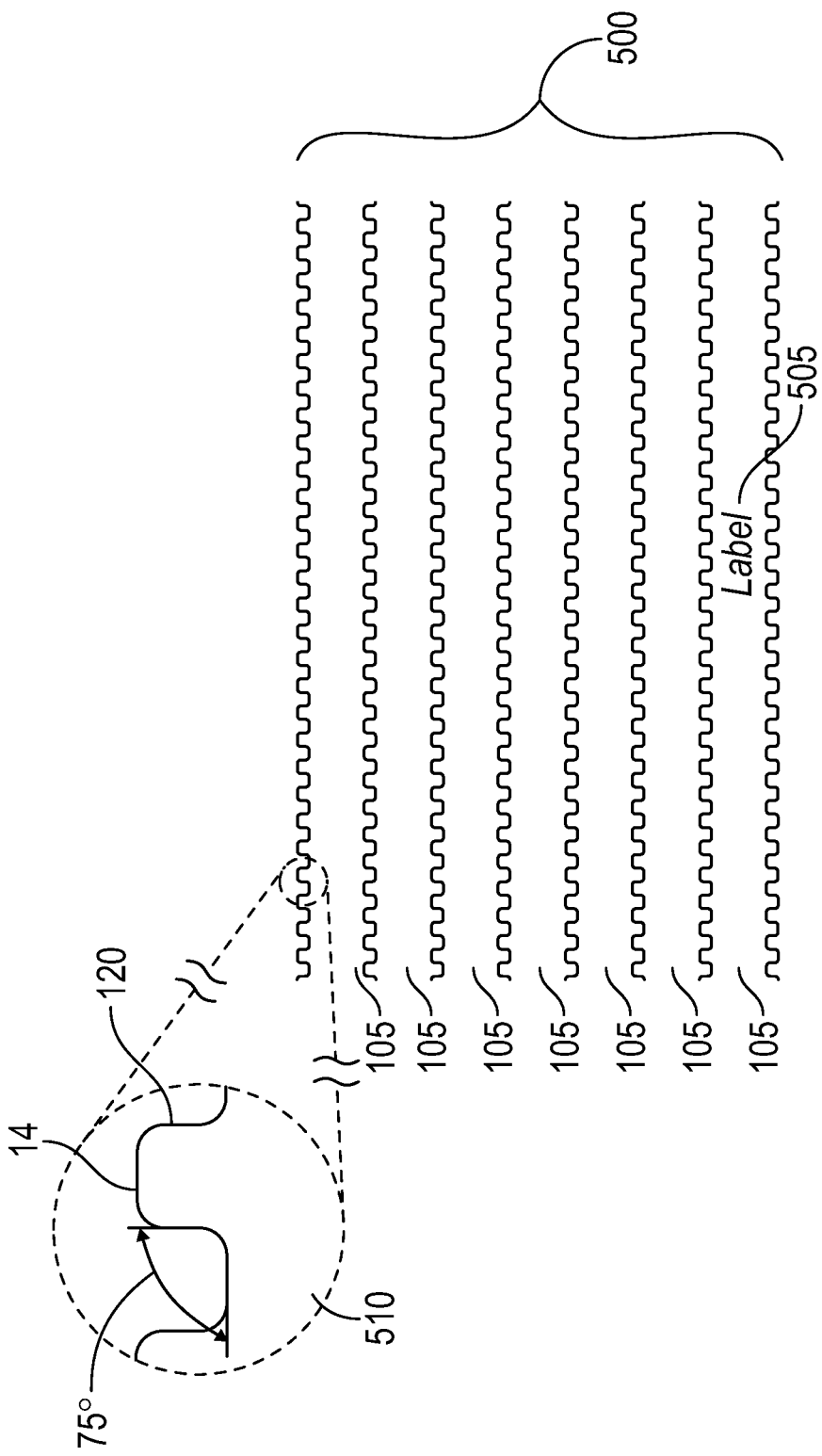
FIG. 5 depicts a sheet of straps, in accordance with the disclosed embodiments.

FIG. 5 also shows an enlargement 510 of a single tooth 120 and an angle of taper from the top of the tooth to the strap of 75 degrees which results in the most secure locking of teeth when the strap is engaged. The degree of taper can range from 70 degrees to 85 degrees. The teeth 120 can be of various shapes and sizes and still accomplish the desired cinching and locking of teeth. In practice, the teeth 120 engage with the edges of the slit 130 opening in the strap 105 to achieve a locking function. Twisting the strap 105 during looping can further enhance teeth 120 engagement to the slit 130.

The shape of the teeth 120 allows multiple ties to be manufactured side-by-side from a single sheet of material 500 without waste of material between straps, as illustrated in FIG. 3B and FIG. 5. Also, because the strap can be cut from a variety of smooth materials, (although ridged or textured materials can also be used for certain applications), printing of an identifier 505, such as a part number or code, upon each individual strap 105 can be easily accomplished. Additionally, because the ties can be manufactured without regard to a specific length (l), the end user can determine the desired length for each individual strap 105.

Figure 6:
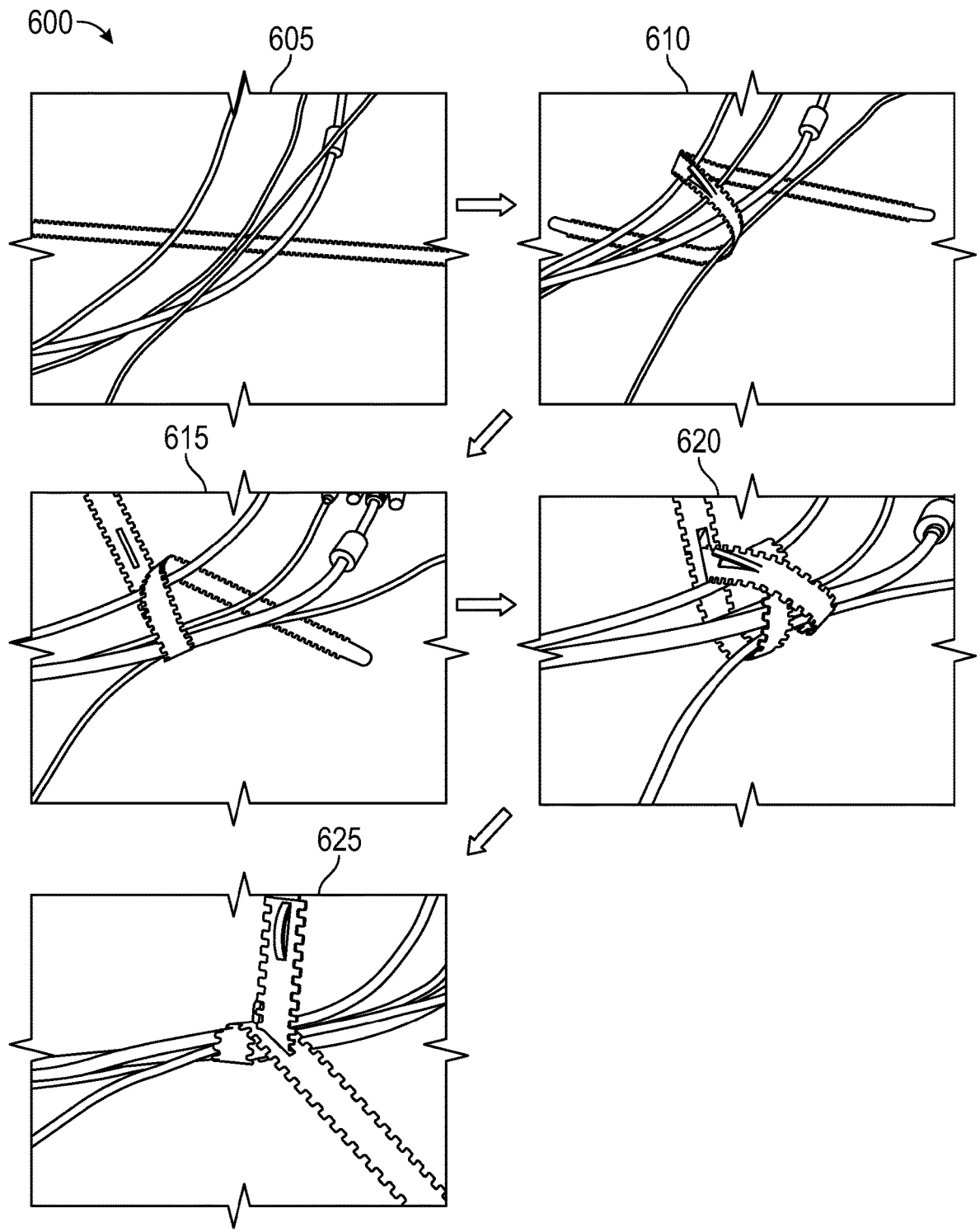
FIG. 6 depicts a binding method using a zip strap tether system, in accordance with the disclosed embodiments.

FIG. 6 illustrates how the zip strap tether system 100, or other such embodiment disclosed herein, functions to cinch and hold items. The zip strap tether system 100 functions by interlocking the teeth when the strap is pulled through the slit 130. Twisting the strap during looping can further enhance the engagement between the teeth and the slot.

As such, FIG. 6 illustrates steps in a method 600 for tying or strapping products using the methods and systems disclosed herein.

Figure 7:
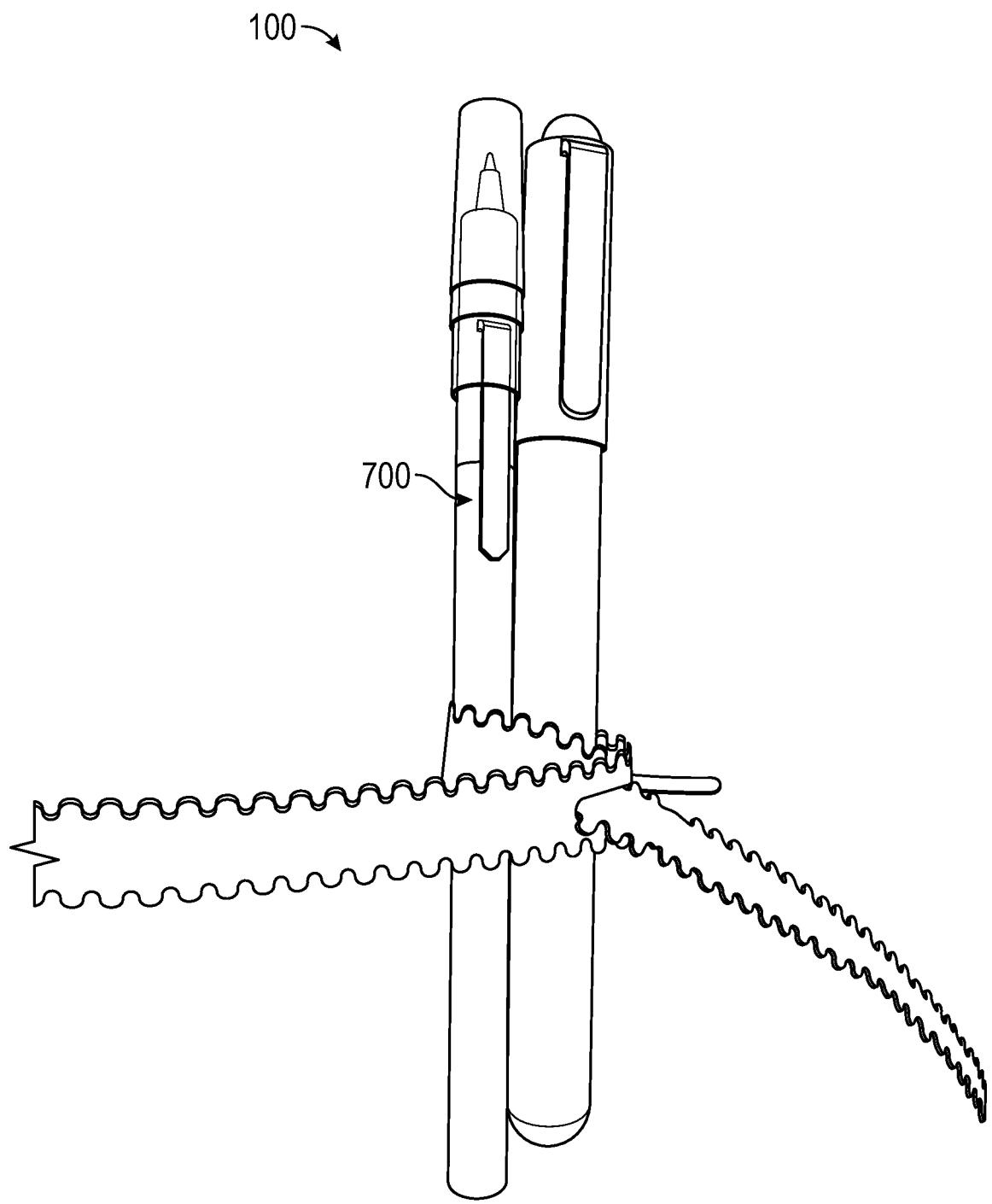
FIG. 7 depicts articles bound with a zip strap tether system, in accordance with the disclosed embodiments.

First, an item or bundle of items can be laid out on the zip strap tether system as illustrated at 605. FIG. 6 illustrates the item or bundle of items as a selection of cords, but it should be appreciated that the system can be used to zip tie or bind any item or selection of items, and can be configured with a loop radius that can be adjusted to the desired application. FIG. 7 illustrates the zip strap tether system 100 used to bind other items 700 in accordance with the disclosed embodiments.

Next at step 610, the zip strap tether system can be wrapped around the item or bundle of items. In certain embodiments, one wrapping may be sufficient. However, the system is uniquely configured such that double wrapping dramatically increases the force required to unbind the tether. As such, in certain embodiments, at step 615, the tether can be wrapped around the bundle of items a second time. In other embodiments, additional wraps around the bundle of items may be desired, and can be included as part of the disclosed method. However, in most circumstances, the strength of the system/method with two loops will be sufficient. In addition, the strap can optionally be twisted as it is looped to improve the grip between the teeth and slit. Twisting is not required but may be advantageous.

Next at step 620 one end of the zip strap tether system can be inserted into one of the slits 130. It is advantageous to select a slit such that the diameter of the loops around the bundle of items is limited. However, the system is configured to be self-adjusting so insertion through any one of the slits will suffice.

The two ends of the system can then be pulled, as shown at step 625, to remove any slack in the loops and tighten the system around the bundle of items. It should be noted, in some embodiments, the slack need not be removed from the loops. The angle of taper of the teeth serve to prevent the teeth from slipping out of the slit, thus creating a secure cinch.

In certain embodiments, the remaining loose ends can be tied in an overhand knot. The angle of taper of the teeth serves to prevent the teeth 14 from slipping past each other, thus further securing the cinch.

To adjust the diameter of the loop, the teeth can be disengaged from the slit and the radius of the loop(s) can be adjusted. The teeth can then be reengaged in the slit. Similarly, to remove the tie, the teeth can simply be removed from the slit and the end can be retracted through the slit.

The zip strap tether system of the present embodiments. can be cinched and un-cinched repeatedly without any loss in effectiveness. Release of the tie is accomplished by pushing the loose end out of the slit in order to unlock the teeth thereby adding slack in the loops around the bundle of items.

It should be appreciated that the disclosed embodiments, are not directional. The disclosed system functions by putting either end of the strap 105 through the central slit 130 to make one or more loops. The catch is achieved by the teeth 120 interlocking with the smooth surfaces of the central slit 130. The direction of the catch therefore does not make a difference in the performance of the disclosed embodiments. The teeth 125 or slits 130 formed in the edges of the strap 105 are configured to hold in the central slit 130 regardless of which loose end of the strap 105 is inserted through the slit 130 and regardless of whether the loose end of the strap is inserted through the slit 130 from the top side of the strap 130 or the bottom side of the strap 130.

It should be appreciated that the disclosed embodiments, can serve as a binding, cinching, strapping, or tying mechanism in a multitude of applications and industries.

Furthermore, the disclosed embodiments can function without full cinching of the bundled or tethered items, allowing for a secure tie without full cinching of the bundle. As such, the system can provide a secure but loose engagement. Because the disclosed embodiments are multidirectional, in some cases, the embodiments can be used to provide a tie that will remain engaged when a load is induced even when the binding is intentionally loose. Applications where this function may be important include staking trees and tethering vines as well as many other applications where a loose tie that will tether items is preferable. For example, a loose tie using the disclosed methods and systems will not inhibit plant growth, and will help avoid girdling of plants. Likewise, a loose tie can be used to reduce the stress on tethered fabrics like netting on fences and around plants, increasing the life of the fabric that is tethered. Numerous other examples exist including tennis court netting secured to a fence, or other such applications where netting is necessarily installed on a fence.

Figure 8A:
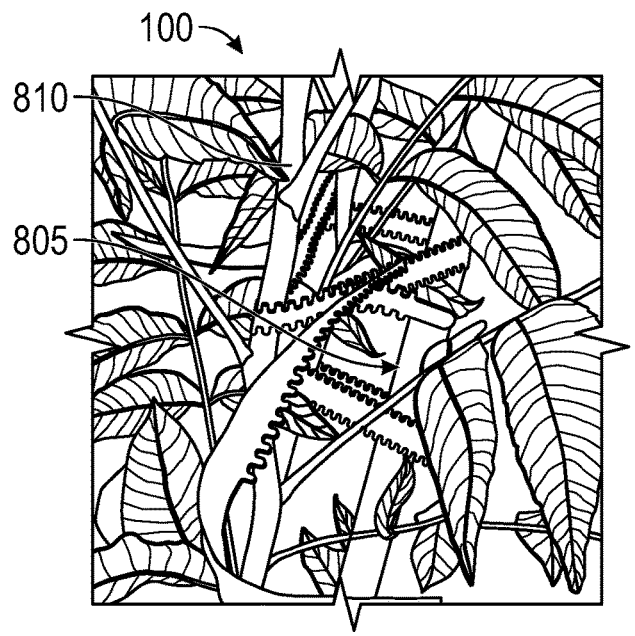
FIG. 8A depicts an application of a zip strap tether system, in accordance with the disclosed embodiments.

For example, in an embodiment, the system is designed for use in plant cinching, bundling, tutoring, tethering and staking applications. In such applications, the system 100 can be configured for the agricultural industry as shown in FIG. 8A and can be made of FDA food grade approved materials. As illustrated in FIG. 8A the system 800 can include a strap 100 loosely tethering a plant 810 to a stake 805. The material can further be selected to maintain integrity in wet applications, be environmentally friendly, and/or be field compostable. An exemplary configuration can be made from compostable and renewable unbleached clay coated virgin kraft paper which offers resistance in wet and windy conditions, has excellent tensile strength, and can be made from renewable and renewed resources. This application can be useful for commercial nursery applications, consumer gardening, industrial packaging, and hydroponics and green-house applications. In certain embodiments, the selected material can be treated carrierboard of 0.016 inches, but other materials and dimensions can also be used. Embodiments can include such materials and laminated layers thereof.

Figure 8B:
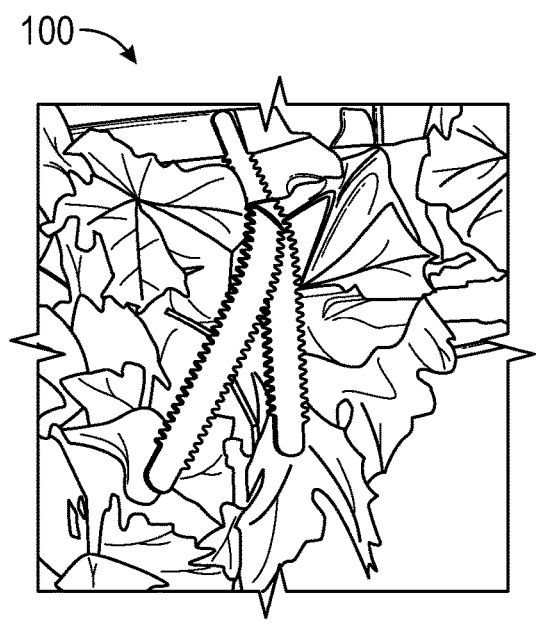
FIG. 8B depicts another application of a zip strap tether system, in accordance with the disclosed embodiments.

FIG. 8B illustrates another such application where the system is used for plant cinching, bundling, tutoring, tethering, and staking. In such embodiments, the material of the strap 100 can be selected to be laminate 0.02 inch coated water base PSA 1.6 Mil PLA compostable plastic film. In other embodiments, other materials can be used. Embodiments can include such materials and laminated layers thereof.

Figure 8C:
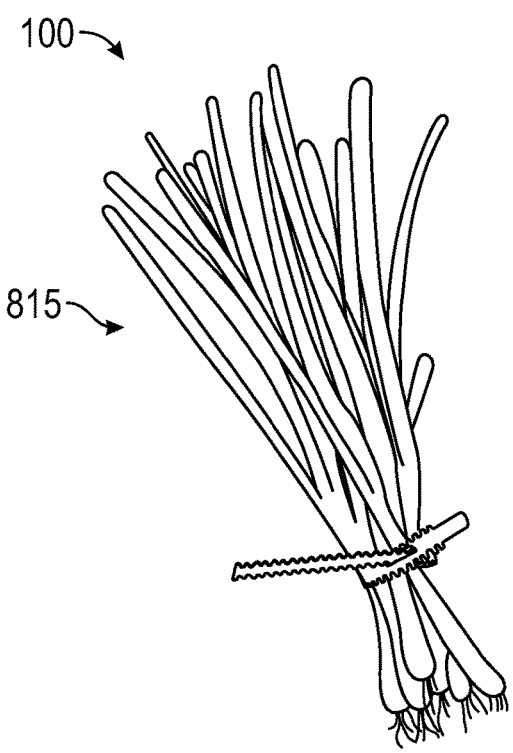
FIG. 8C depicts another application of a zip strap tether system, in accordance with the disclosed embodiments.

FIG. 8C illustrates another such application where the system is used for produce bundling or floral packaging. In such embodiments, the strap 100 can be used to bind produce 815. In such applications, the material can be selected to be made of FDA food grade approved materials. The material can be selected to be paper 16 point clay coat coated kraft fiber wet strength carrierboard, containing recycled materials. In other embodiments, other materials can be used. Embodiments can include such materials and laminated layers thereof. Such embodiments can be used for staking of nursery plants for transportation and seasonal staking and vine and stem tethering. The systems can also be used to train and tether vines, stems and branches for a single season. Because the embodiments are biodegradable, no field trash removal is required.

Figure 8D:
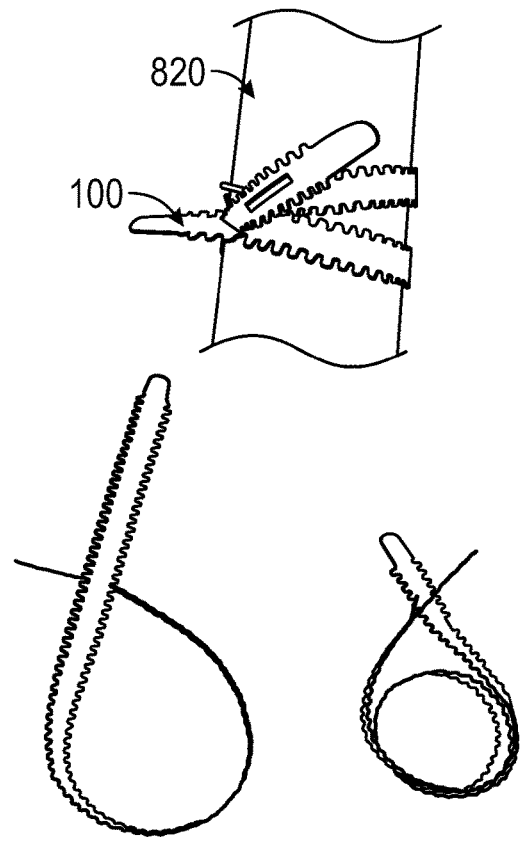
FIG. 8D depicts another application of a zip strap tether system, in accordance with the disclosed embodiments.

FIG. 8D illustrates another such application where the system is used for household and industrial application, cinching, bundling, building, tutoring, tether, and staking. In such applications the strap 100 can be bound to conduit 820, or other such industrial, commercial, or household article. The material can be selected to be UL approved, flame retardant, maintain integrity when wet, have a low environmental impact, and strong. The material is selected such that it can easily be tightened or loosened as disclosed herein. In such embodiments, the material can be selected to be reinforced polypropylene. In other embodiments, other materials can be used. Embodiments can include such materials and laminated layers thereof.

Figure 8E:
FIG. 8E depicts another application of a zip strap tether system, in accordance with the disclosed embodiments.

FIG. 8E illustrates another such application where the system is used for plant cinching, bundling, tutoring, tether, and staking. In such applications, the material can be selected to be configured with FDA food grade approved materials and serves as a direct replacement to toxic vinyl tape. The material can be selected to be environmentally friendly and field compostable. The system places low girdling stress on the plant and is rapidly adjustable. The system can also be tear resistance when wet and tolerant to high wind and rain. In certain embodiments, the material can be selected to be laminate 0.16 point wet strength carrierboard with 2 mil pla corn based compostable film. In other embodiments, other materials can be used. Embodiments can include such materials and laminated layers thereof.

Another such application includes using the system 400 for compostable agriculture applications for cinching, bundling, tutoring, tether, and staking. In such applications, the material can be selected to be configured with one or more straight edges for easy reusable zipping and unzipping. The system 400 can be used for tying or bundling produce or other such products. The system 400 can be configured of FDA food grade approved materials selected to maintain integrity in wet applications. The surface can be configured for to accept custom printing or labeling. The material can be selected to provide at least 10 lbs. minimum hold strength, both wet and dry. In certain embodiments, the material can be selected to be wet strength 16 pt. clay coated kraft/recycled fiber carrierboard. In other embodiments, other materials can be used. Embodiments can include such materials and laminated layers thereof.

Figure 9A:
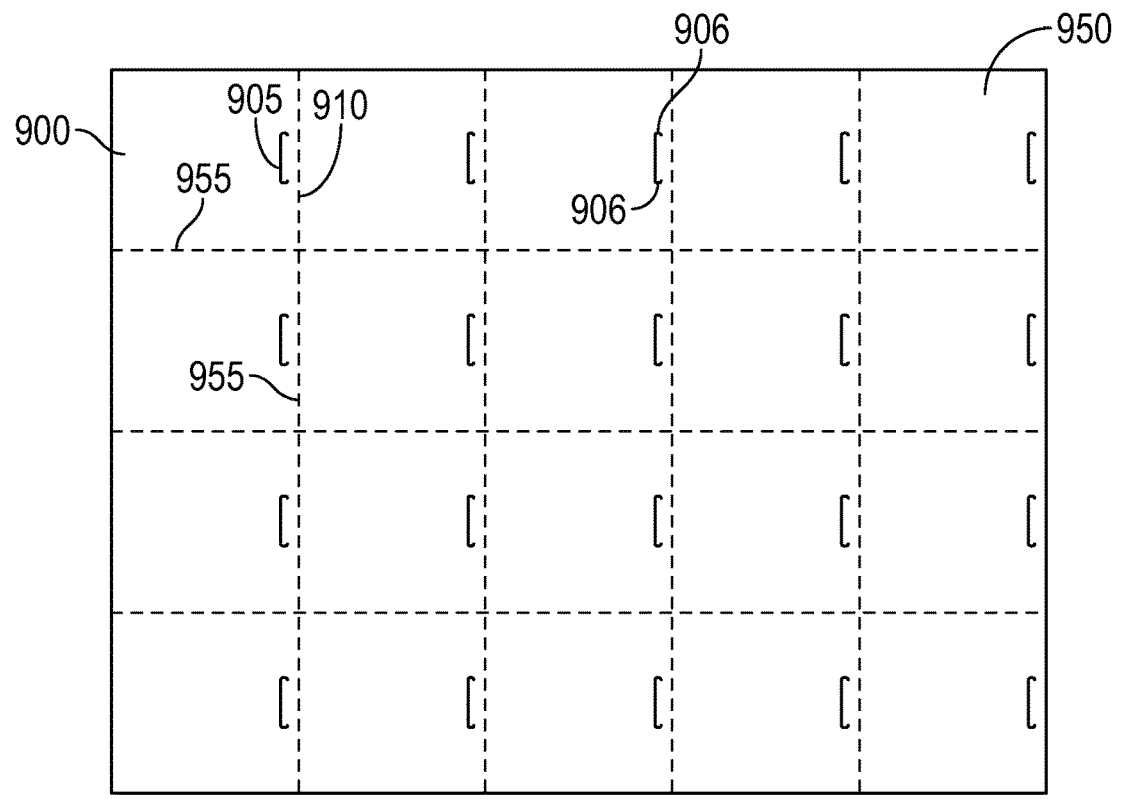
FIG. 9A depicts a sheet of tags, in accordance with the disclosed embodiments.
Figure 9B:
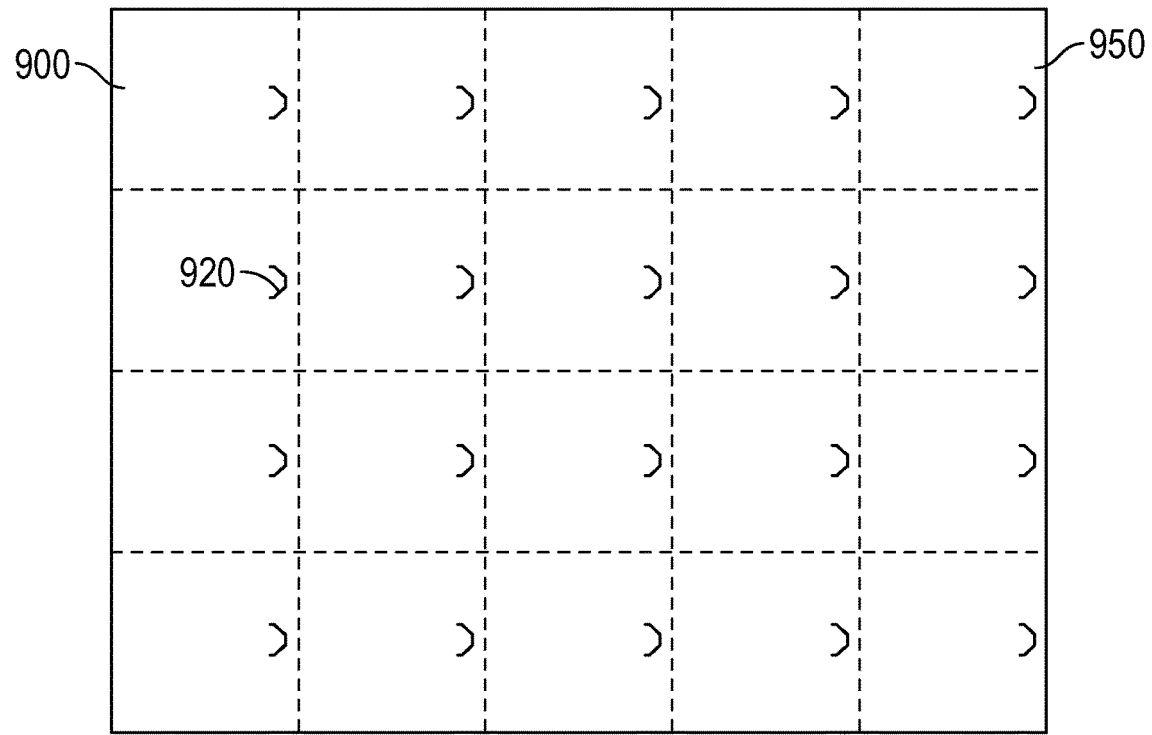
FIG. 9B depicts a sheet of tags, in accordance with the disclosed embodiments.
Figure 9C:
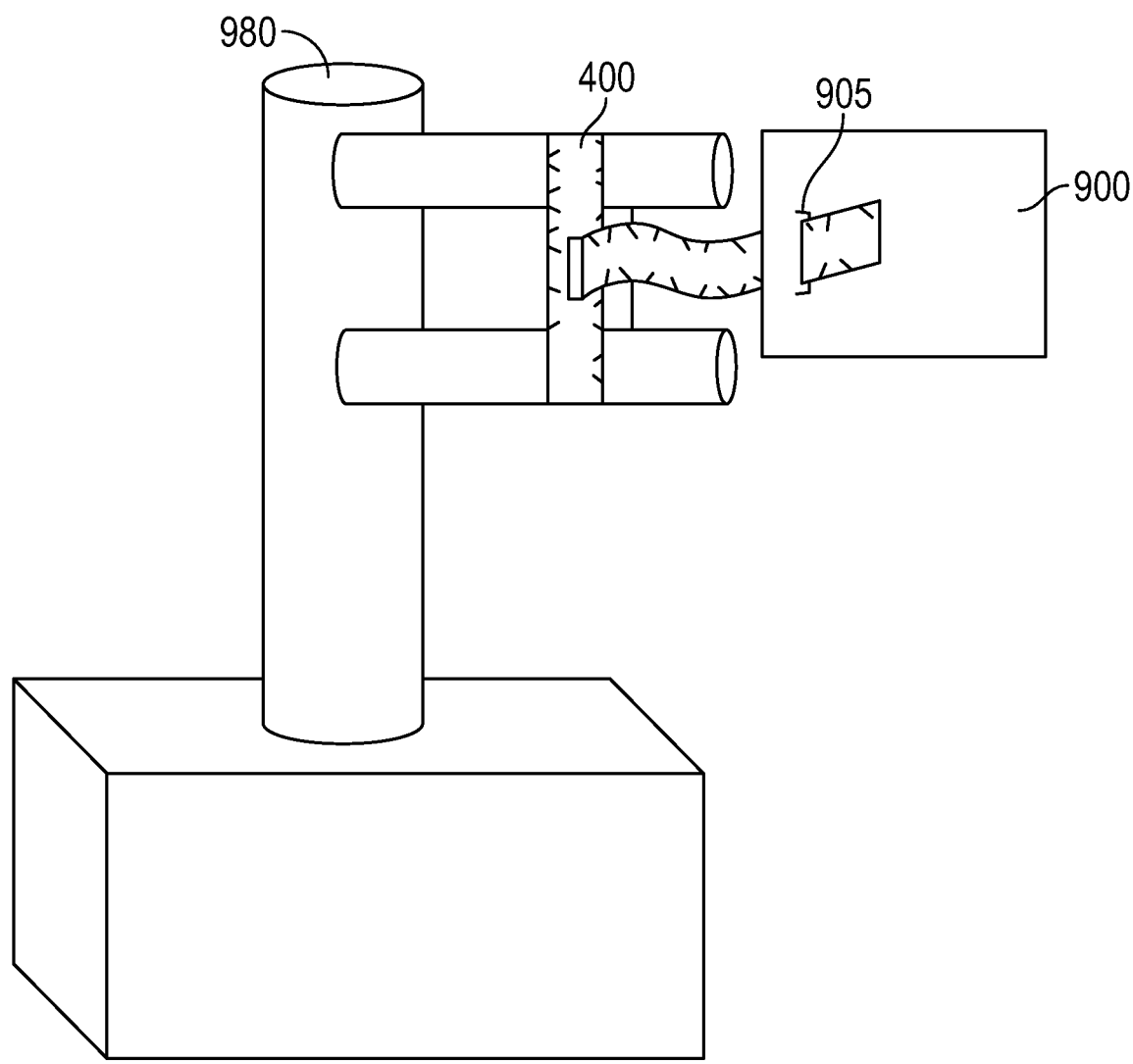
FIG. 9C depicts a zip strap tether system deployed with a tag, in accordance with the disclosed embodiments.

FIGS. 9A-9C illustrate additional aspects of the disclosed systems and methods. In certain embodiments, a custom tag 900 can be affixed to one or more of the straps detailed herein. In certain embodiments, the tag 900 can comprise a generally flat material with a strap connecting slit 905 formed in the tag 900. In certain embodiments, the strap connecting slit 905 can be formed generally in the center of the tag 900 and nearer to the top edge 910 of the tag. However, in other embodiments, the location of the slit 905 can be selected according to associated application parameters.

The tag slit 905 can be configured in numerous ways. In the embodiment illustrated in FIG. 9A, the tag slit 905 can be selected to be slightly narrower than the associated strap system (such as system 100 or system 400). The dimension of the slit 905 can be selected so that the teeth 120 or slits 415 in the strap engage the ends of the tag slit 905 so that the tag slit 905 is fixedly connected to the strap. The tag slit 905 can further include upturned ends 906 which can further ease the task of inserting the strap through the slit 905 and ensure the tag 900 is engaged to the strap. The tag 900 can be removed from the strap by depressing the tag 900 to disengage the teeth 120 or slits 415 in the strap from the tag slit 905 and then sliding the tag 900 off the strap. In FIG. 9B an embodiment of the tag 900 is illustrated with a curved tag slit 920. The curved tag slit 920 can be selected to facilitate engagement of the tag 900 with the strap for certain applications.

As further illustrated in FIG. 9A and FIG. 9B, the tags 900, as disclosed herein, can be produced in sheets 950. The sheets 950 can include an array of tags 900 defined by perforations 955, such that each tag 900 can be torn off the sheet 950 and individually engaged to a strap. In certain embodiments, each tag 900 can include identical markings, or each tag can be individually and/or uniquely marked.

The tag 900 is beneficial for purposes of labeling, identification, or other such purposes including but not limited to agricultural bundling, produce bundling, or floral packaging. FIG. 9C illustrates the tag 900 affixed to an apparatus 980 with a strap 400. The tag can be comprise a non-adhesive custom printable tag for bar codes, decorative purposes, descriptive purposes, pricing, labeling, and the like. The tag can be mad of FDA food grade approved materials which maintain integrity in wet storage. The materials can be selected to be environmentally friendly, renewable, compostable, and can be selected to be any material detailed in association with other embodiments disclosed herein.

Figure 10A:
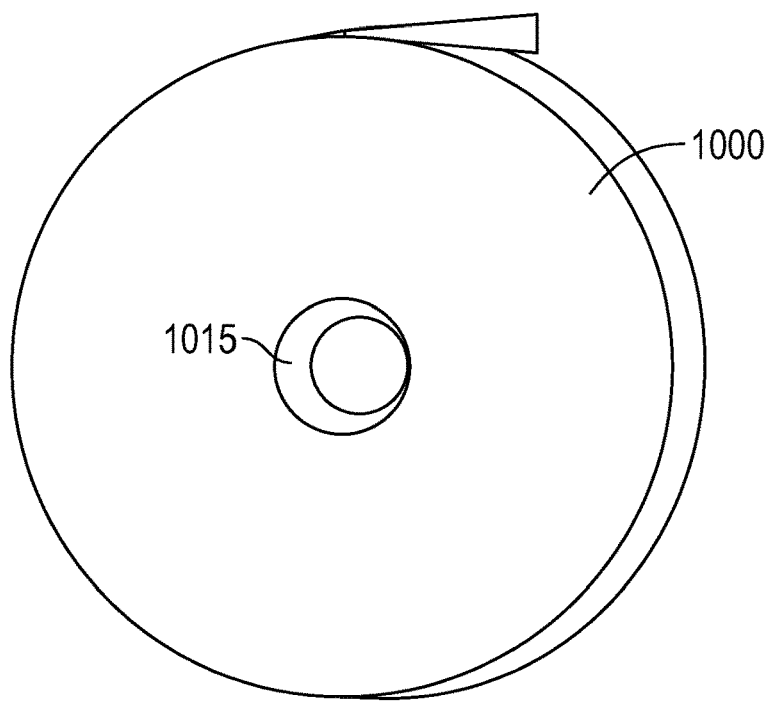
FIG. 10A depicts a roll of straps, in accordance with the disclosed embodiments.
Figure 10B:
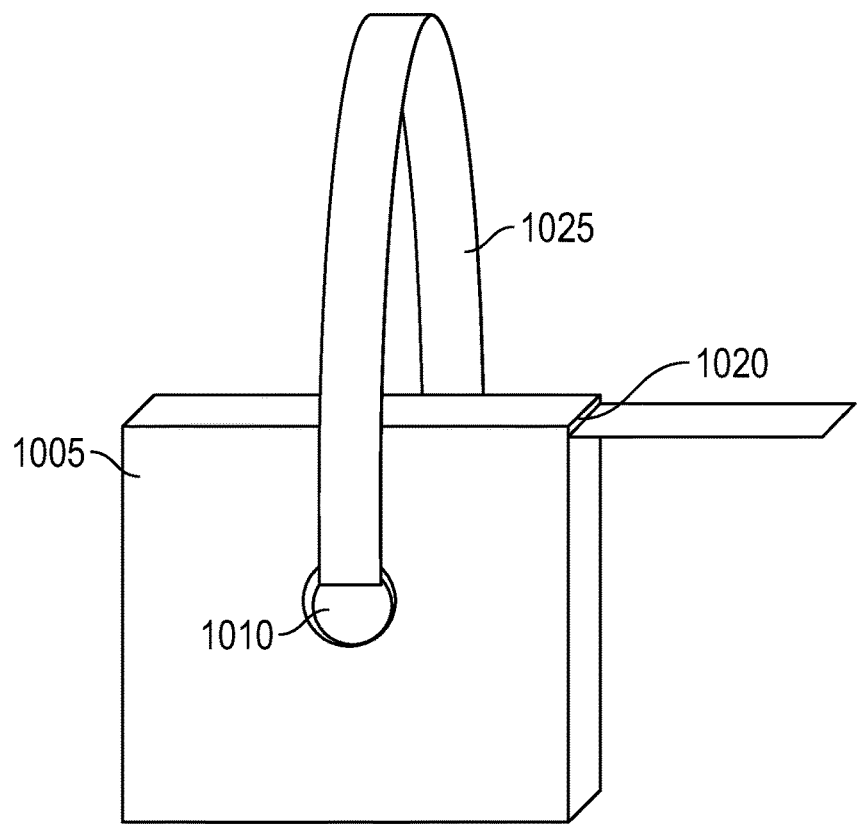
FIG. 10B depicts a box configured to hold a roll of straps, in accordance with the disclosed embodiments.

FIGS. 10A and 10B further illustrate aspects of the disclosed embodiments. In certain embodiments, a roll 1000 of strap material, as disclosed herein, can be stored in a dispensing box 1005. The dispensing box 1005 can generally be configured with an orifice 1010 at or near the center of the box 1005. The center of the roll 1000 can include a tubular mount 1015 around which the strap material can be wound. The tubular mount 1015 can be aligned to match the orifice 1010 in the dispensing box 1005.

The dispensing box 1005 can further include an opening slot 1020 through which the tag end of the roll 1000 of strap material can be pulled. The tag end can be pulled from the roll 1000 through the opening slot 1020 to the desired length and can then detached from the roll 1000 of strap material for deployment.

In certain embodiments, the hole 1010 in the dispensing box 1005 can further serve as a connection point for an arm strap 1025. The strap 1025 can be selected to fit over a person's shoulder, around their waste, as a hand strap, etc. the arm strap 1025 can be used to hold the dispensing box 1005 and the roll 1000 of strap material contained therein as the system is moved from one point to another.

Based on the foregoing, it can be appreciated that a number of embodiments, preferred and alternative, are disclosed herein. For example, in an embodiment a zip strap tether system comprises a strap, a plurality of teeth formed on at least one edge of the strap, and at least one slit in the strap.

In an embodiment, the plurality of teeth formed on at least one edge of the strap further comprise a plurality of teeth from on a first edge of the strap, and a plurality of teeth formed on a second edge of the strap. In an embodiment, the plurality of teeth formed on at least one edge of the strap further comprise a plurality of teeth from on a first edge of the strap and a smooth edge formed on a second edge of the strap. In an embodiment, the plurality of teeth formed on at least one edge of the strap further comprise a plurality of slits from on a first edge of the strap and a plurality of slits formed on a second edge of the strap. In an embodiment, the plurality of teeth formed on at least one edge of the strap further comprise a plurality of slits from on a first edge of the strap and a smooth edge formed on a second edge of the strap.

In an embodiment, the zip strap tether system further comprises at least one perforation across the strap. In an embodiment, the at least one slit in the strap comprises a plurality of slits in the strap configured along the longitudinal axis of the strap. In an embodiment, the system further comprises at least one chad formed in the at least one slit. In an embodiment, the zip strap tether system further comprises a grip tip formed on at least one end of the strap.

In an embodiment, the strap comprises at least one of: renewable unbleached clay coated virgin kraft paper, treated carrierboard laminate coated water base compostable plastic film, paper clay coat coated kraft fiber wet strength carrierboard, reinforced polypropylene, laminate wet strength carrierboard with corn based compostable film, and wet strength clay coated recycled fiber carrierboard.

In an embodiment, the zip strap tether system further comprises a tag comprising a tag slit, wherein the strap is configured to fit through the tag slit.

In an embodiment, the zip strap tether system further comprises a cylindrical base structure wherein the strap is wound on the cylindrical base structure. In an embodiment, the zip strap tether system further comprises a box, the box configured to house the strap wound on the cylindrical base structure and an opening slot configured in the box. In an embodiment, the zip strap tether system further comprises an arm strap configured on the box.

In an embodiment, a binding method comprises wrapping a strap comprising a plurality of teeth formed on a first edge of the strap, a plurality of teeth formed on a second edge of the strap, and at least one slit in the strap around an object, forming a loop around the object, inserting an end of the strap through the slit in the strap, and pulling out slack in the loop. In an embodiment, the binding method further comprises wrapping the strap around the object at least twice. In an embodiment, the binding method further comprises tying a knot in the strap after the slack in the loop has been pulled.

In another embodiment, a zip strap tether system comprises a sheet of at least two straps, a plurality of teeth formed on at least one edge of each of the at least two straps, and at least one slit in the strap. In an embodiment, the zip strap tether system further comprises a cylindrical base structure wherein the sheet of at least two straps is wound on the cylindrical base structure. In an embodiment, the plurality of teeth formed on one of the at least two straps is interleaving with the plurality of teeth formed on another of the at least two straps.

It will be appreciated that variations of the above-disclosed and other features and functions, or alternatives thereof, may be desirably combined into many other different systems or applications. Also, it should be appreciated that various presently unforeseen or unanticipated alternatives, modifications, variations or improvements therein may be subsequently made by those skilled in the art which are also intended to be encompassed by the following claims.

What is claimed is:

1. A zip strap tether system comprising:
   a strap comprising a strap body, a first edge, and a second edge;
   a plurality of teeth formed uniformly along an entire length of the first edge of the strap wherein each of the plurality of teeth formed uniformly along the entire length of the first edge of the strap is quadrilateral;
   a plurality of teeth formed uniformly along an entire length of the second edge of the strap wherein each of the plurality of teeth formed uniformly along the entire length of the second edge of the strap is quadrilateral;
   a plurality of slits in the strap, the plurality of slits each comprising an oval-shaped opening wherein each of the plurality of slits is configured on a longitudinal axis of the strap, wherein all of the plurality of slits in the strap are equidistant from one another and co-linear on the longitudinal axis of the strap; and
   a removable chad formed in each of the plurality of slits.

2. The zip strap tether system of claim 1 further comprising:
   troughs separating the plurality of teeth formed on the first edge of the strap wherein the troughs separating the plurality of teeth formed on the first edge of the strap are inverse in shape to the plurality teeth; and
   troughs separating the plurality of teeth formed on the second edge of the strap wherein the troughs separating the plurality of teeth formed on the second edge of the strap are inverse in shape to the plurality teeth.

3. The zip strap tether system of claim 1 further comprising:
   at least one perforation across the strap.

4. The zip strap tether system of claim 1 further comprising:
   a grip tip formed on at least one end of the strap, the grip tip comprising:

a smooth edge; and a textured surface.

5. The zip strap tether system of claim 1 wherein the strap comprises at least one of:

renewable unbleached clay coated virgin kraft paper;

treated carrierboard laminate coated water base compostable plastic film;

paper clay coat coated kraft fiber wet strength carrierboard;

laminate wet strength carrierboard with corn based compostable film; and wet strength clay coated recycled fiber carrierboard.

6. The zip strap tether system of claim 1 further comprising:

a tag comprising a tag slit, wherein the strap is configured to fit through the tag slit.

7. The zip strap tether system of claim 1 further comprising:

a cylindrical base structure wherein the strap is wound on the cylindrical base structure.

8. The zip strap tether system of claim 7 further comprising:

a box, the box configured to house the strap wound on the cylindrical base structure; and an opening slot configured in the box.

9. The zip strap tether system of claim 1 wherein each of the plurality of teeth has a width (w') at its widest point that is one fourth a width (w) of the strap body; and wherein each of the plurality of teeth has a tooth length (L') that is one half the width (w) of the strap body.

* * * * *